(No Model.)
2 Sheets—Sheet 2.
J. W. BISHOP.
AUTOMATIC FIRE EXTINGUISHER.
No. 260,640. Patented July 4, 1882.
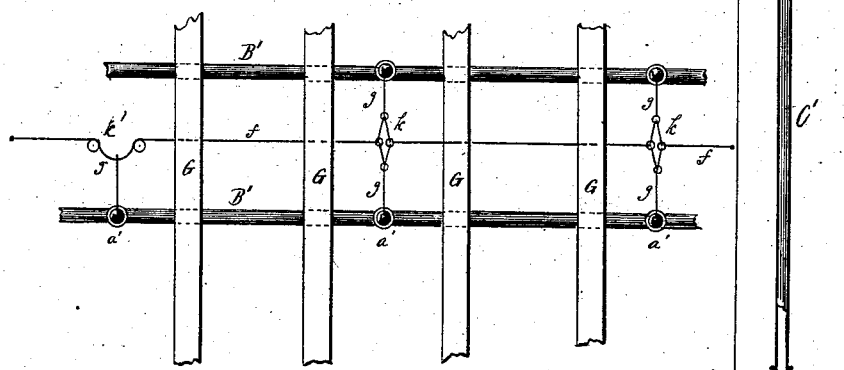
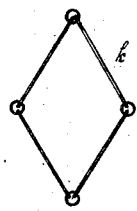
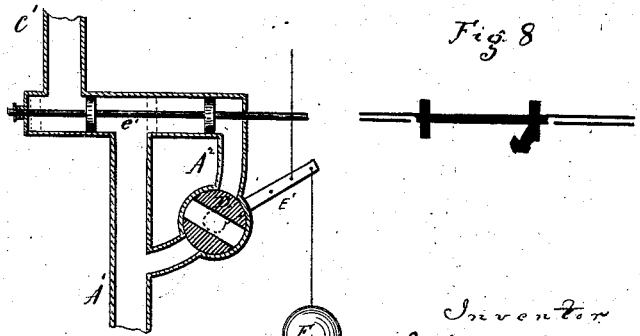
Witnesses
John F Bishop
B H Johnson
Inventor
John W Bishop (No Model.)
J. W. BISHOP.
FIRE EXTINGUISHING APPARATUS.
No. 260,641. Patented July 4, 1882.